United States Patent [19]

Higgins et al.

[11] Patent Number: 5,201,831
[45] Date of Patent: Apr. 13, 1993

[54] AIRCRAFT INTERIOR SHELL

[75] Inventors: William R. Higgins, Clearwater, Fla.; Otto C. Pobanz, Cincinnati, Ohio

[73] Assignee: ATR International, Inc., Clearwater, Fla.

[21] Appl. No.: 792,719

[22] Filed: Nov. 15, 1991

[51] Int. Cl.⁵ .................... B64D 11/00; B64C 1/06
[52] U.S. Cl. .................... 244/119; 244/118.5
[58] Field of Search ............... 244/117 R, 119, 118.5; 105/337, 330, 401, 397, 329.1, 323

[56] References Cited

U.S. PATENT DOCUMENTS

| | | | |
|---|---|---|---|
| 2,877,970 | 3/1959 | Albertine | 244/119 |
| 3,071,217 | 1/1963 | Gould | 189/34 |
| 3,160,549 | 12/1964 | Caldwell | 161/161 |
| 3,600,016 | 8/1971 | Dilley | 244/119 |
| 4,050,208 | 9/1977 | Pompei et al. | 244/119 |
| 4,310,132 | 1/1982 | Robinson et al. | 244/119 |
| 4,425,980 | 1/1984 | Miles | 181/208 |
| 4,442,647 | 4/1984 | Olsen | 52/393 |
| 4,635,882 | 1/1987 | SenGupta et al. | 244/119 |
| 4,678,226 | 7/1987 | Ishizuka et al. | 244/118.5 |
| 4,799,631 | 1/1989 | Humphries et al. | 244/118.5 |
| 5,044,578 | 9/1991 | White et al. | 244/118.5 |
| 5,129,597 | 7/1992 | Manthey et al. | 244/118.5 |

Primary Examiner—Galen Barefoot
Attorney, Agent, or Firm—Herbert W. Larson

[57] ABSTRACT

An aircraft interior skeleton spaced apart from the aircraft frame is formed from multiple spaced apart upright U-shaped ribs attached to horizontal intercostal U-shaped members conforming to the aircraft frame members, but not contacting such frame members. Multiple interior honeycomb side panels and overhead panels are hinged from the interior skeleton and interlocked with adjacent panels. An overhead connecting member is attached to a top end of each rib and a dampening device connects the bottom end of each rib to an aircraft frame member. Adjustable cable connectors position the interior skeleton within the aircraft by connecting the horizontal intercostal members to the aircraft frame members.

8 Claims, 9 Drawing Sheets

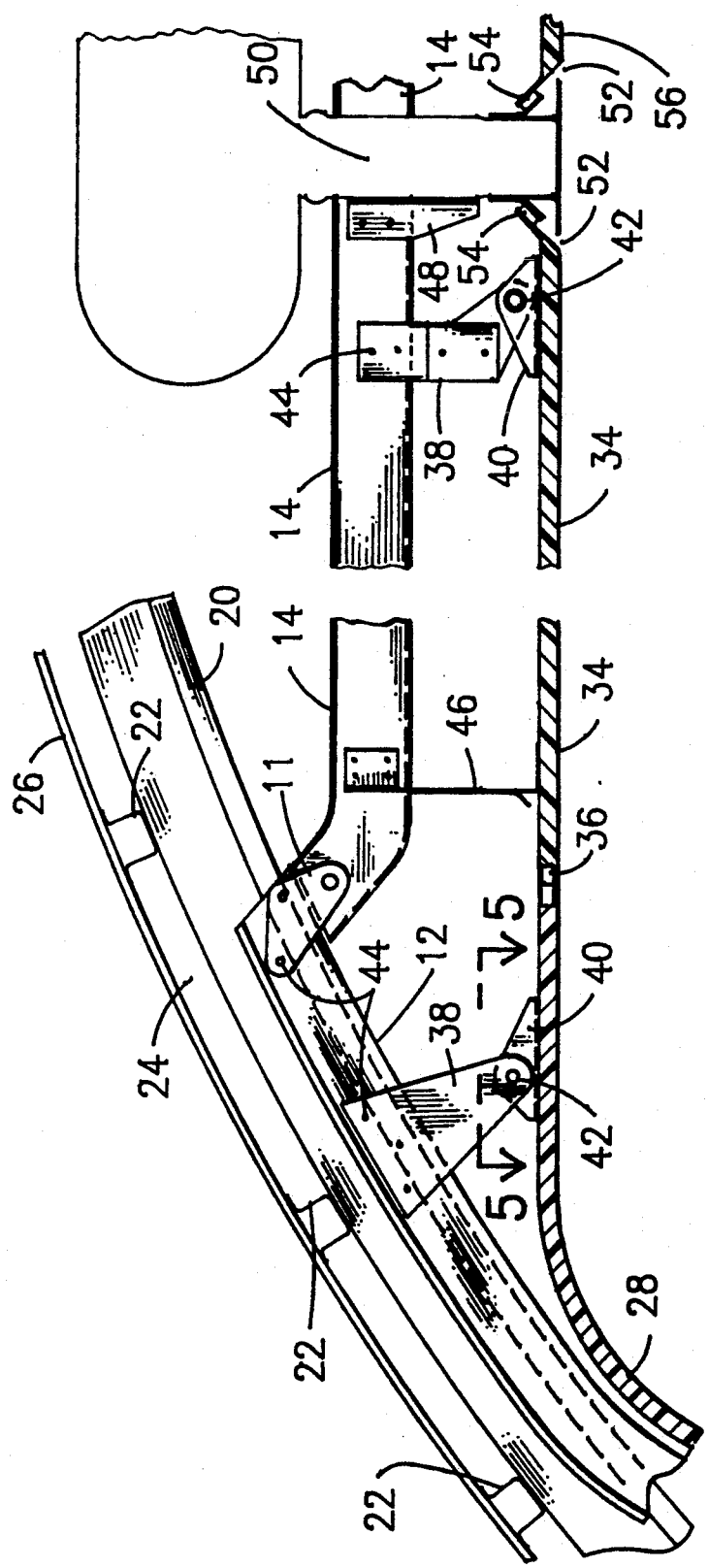

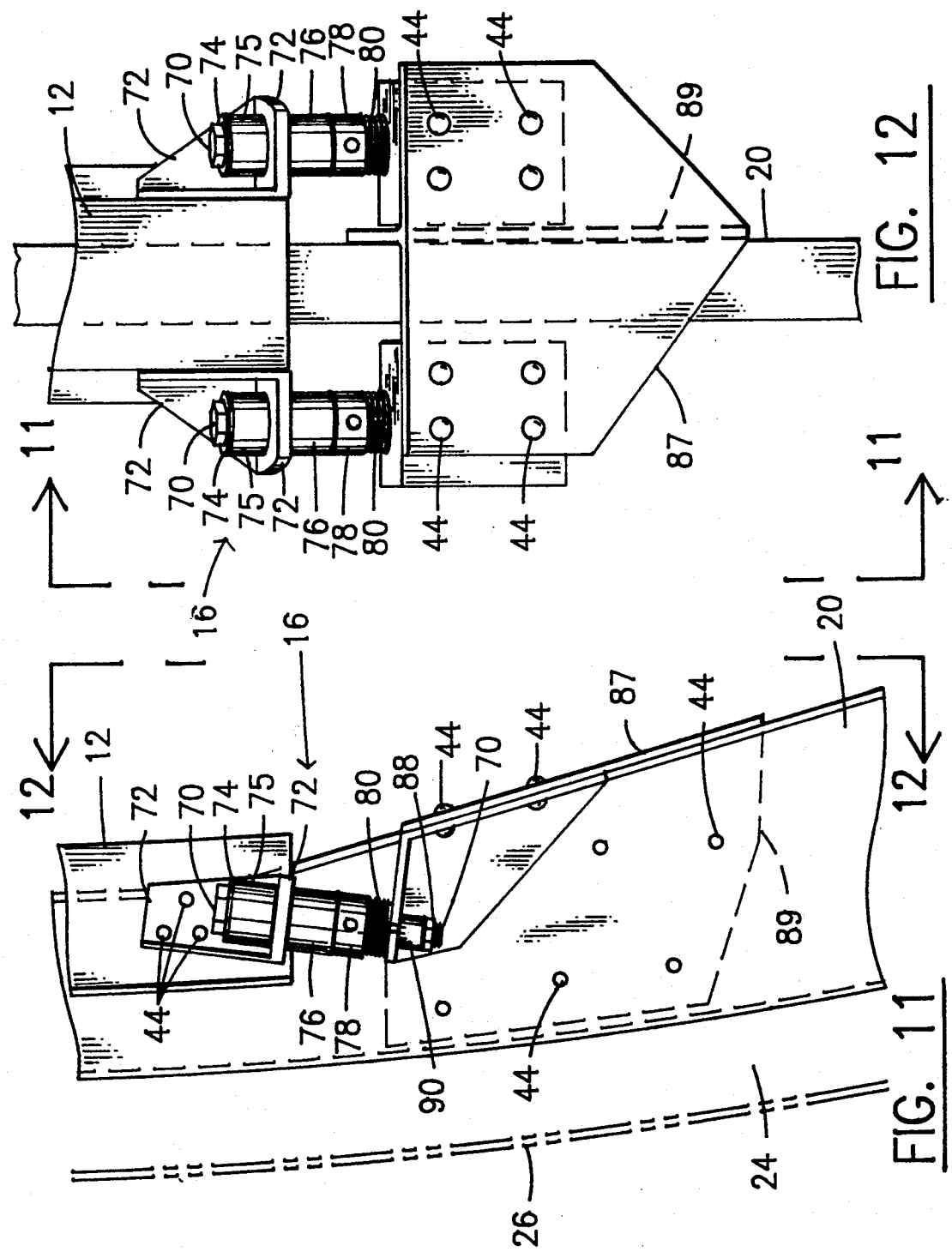

AIRCRAFT INTERIOR SHELL

BACKGROUND OF THE INVENTION

1. Field of The Invention

This invention relates to aircraft interior frame structures. More particularly, it refers to an aircraft interior skeleton formed from multiple upright arched carbon fiber ribs connected to horizontal intercostal members with interior panels hinged from the skeleton.

2. Description of The Prior Art

A self-supporting aircraft shell module for the interior of an aircraft fuselage is described in U.S. Pat. No. 4,799,631. This module is self-supporting and contains all necessary interior aircraft auxiliary equipment. Each side panel is mounted in multiple elastomeric isolators located in overhead channels and deck channels. This type module is extremely useful in reducing engine noise to persons within an aircraft since the module does not transfer noise vibration to the interior of the aircraft. However, with this module it is difficult to gain access to the interior skin of the aircraft. In aircraft usage, it is necessary, on occasion, to have access to the space between the interior panels and the skin of the aircraft to repair or replace aircraft controls, hydraulic systems and electrical equipment, as well as make hull inspections to detect corrosion or other hull damage. A need therefore exists for a sound modulating system for an aircraft interior shell that provides a means for easy access to the space between the panels and the aircraft skin.

SUMMARY OF THE INVENTION

We have developed a carbon fiber rib supported interior skeleton isolating the interior of an aircraft from loud engine nose and providing swing down panels for easy access to the aircraft controls, electronic systems, hydraulic systems and hull structure.

Our skeleton has a series of port and starboard arched carbon fiber rib members, each one attached to an overhead lateral connecting member at one end and to a noise dampening member at a second end. Multiple longitudinal intercostal members are attached to the rib members. Affixed to the intercostal members and top connecting members are panels to form an aircraft interior compartment. Sidewall, ceiling and valance panels are suspended on the longitudinal intercostal members or overhead connecting members with quick release pins and hinges for rapid removal to expose the controls, electrical and hydraulic systems, as well as the aircraft hull.

BRIEF DESCRIPTION OF THE DRAWINGS

The invention may be best understood by those having ordinary skill in the art by reference to the following detailed description when considered in conjunction with the accompanying drawings in which:

FIG. 2 is an enlarged view of the top connection of a rib member to an overhead lateral connector member.

FIG. 3 is an enlarged view of the overhead lateral connector attached to an overhead panel.

FIG. 11 is an elevational view of a dampening device attached to the aircraft frame at the bottom of each rib member along line 11—11 of FIG. 12.

FIG. 12 is an elevational view of the dampening device along lines 12—12 of FIG. 11.

DETAILED DESCRIPTION OF THE INVENTION

Figure 1:
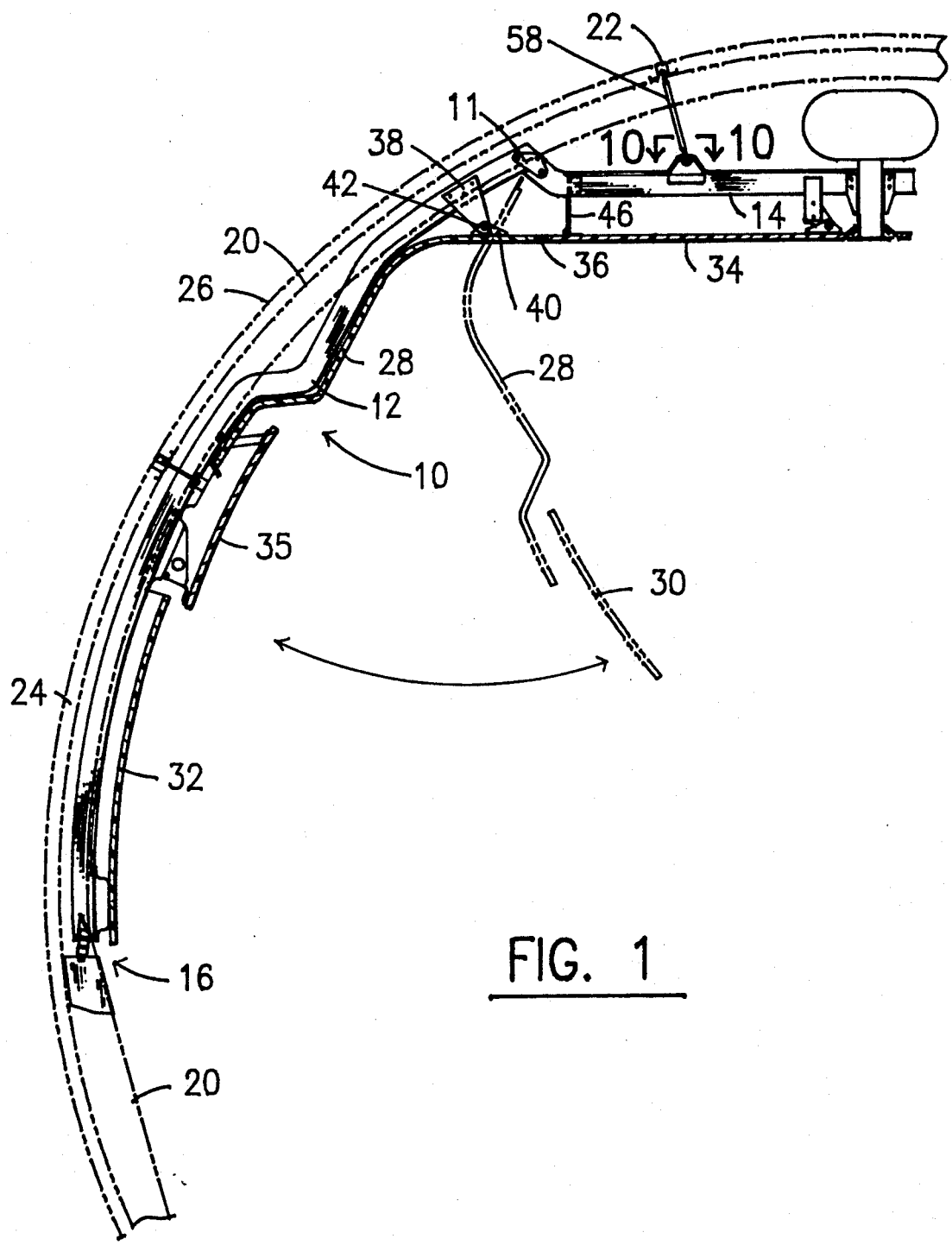
FIG. 1 is a port side elevational view of an arched rib member and interior shell panels with aircraft skin and frame shown in phantom.

Throughout the following detailed description, the same reference numerals refer to the same elements in all figures.

Figure 8:
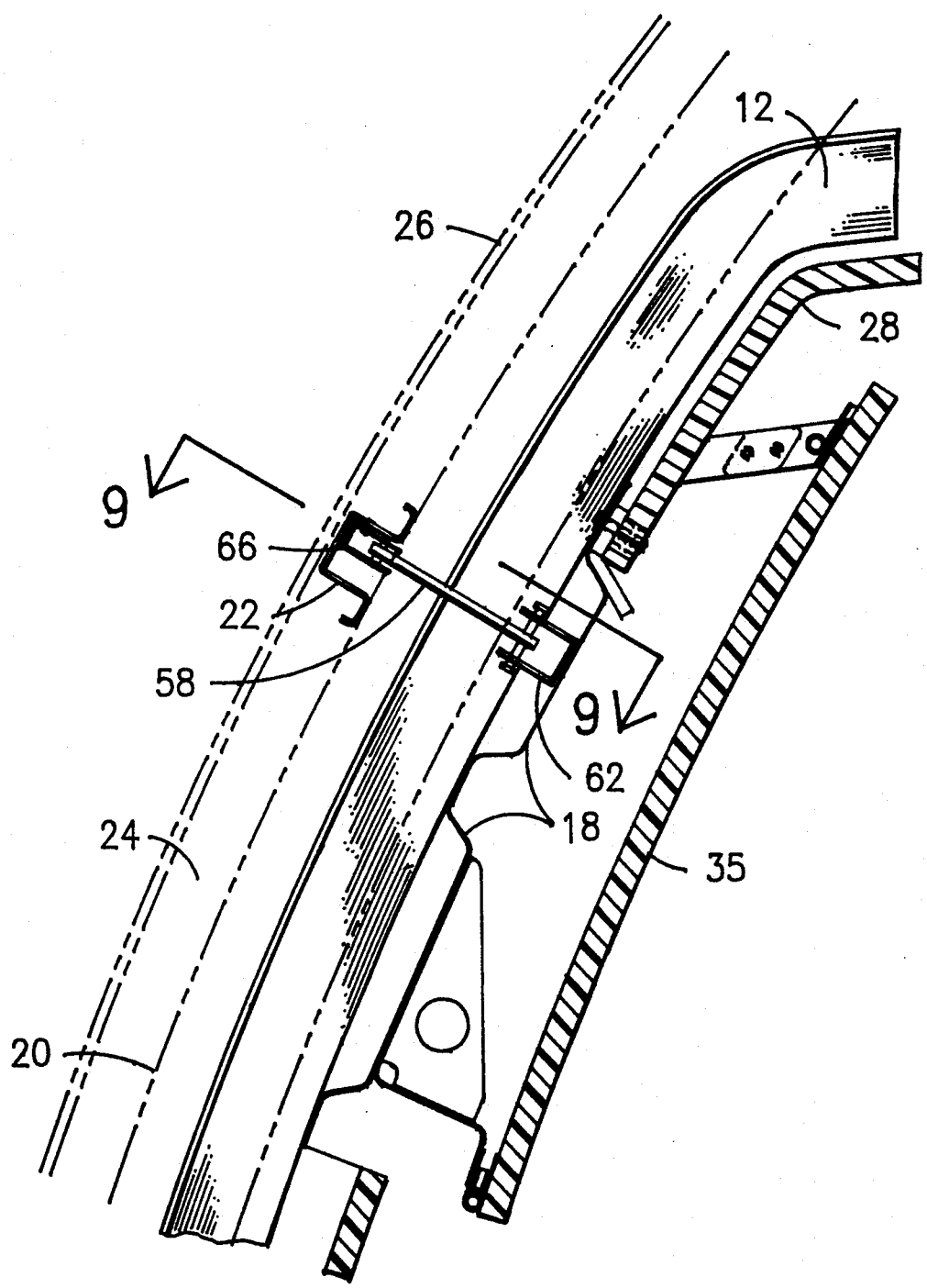
FIG. 8 is a side sectional view of an attachment device connecting a horizontal intercostal member to an aircraft horizontal frame member.
Figure 9:
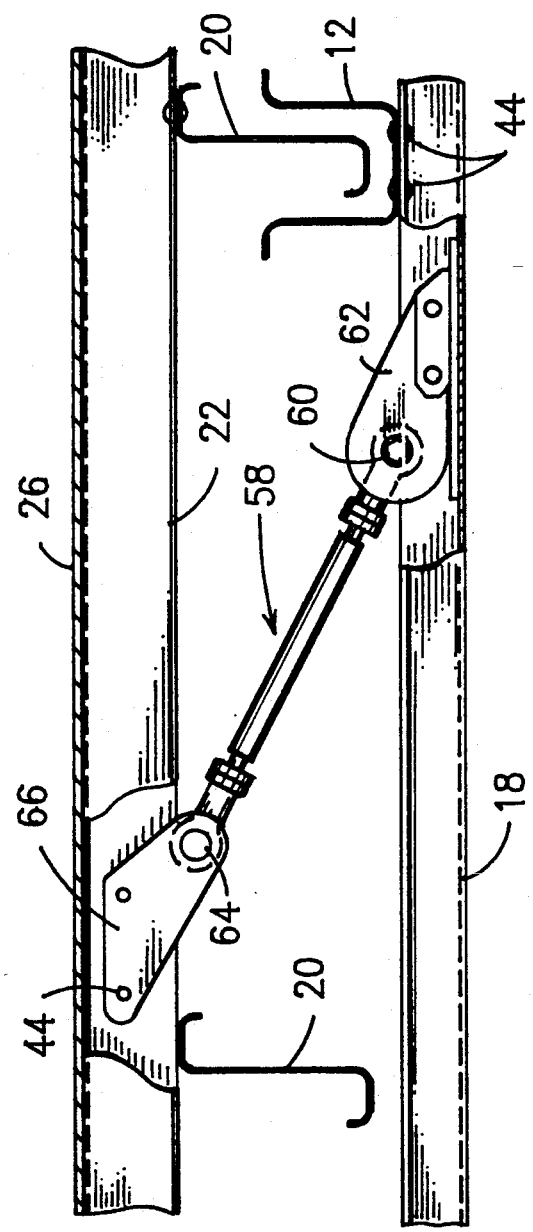
FIG. 9 is a view along lines 9—9 of FIG. 8.
Figure 10:
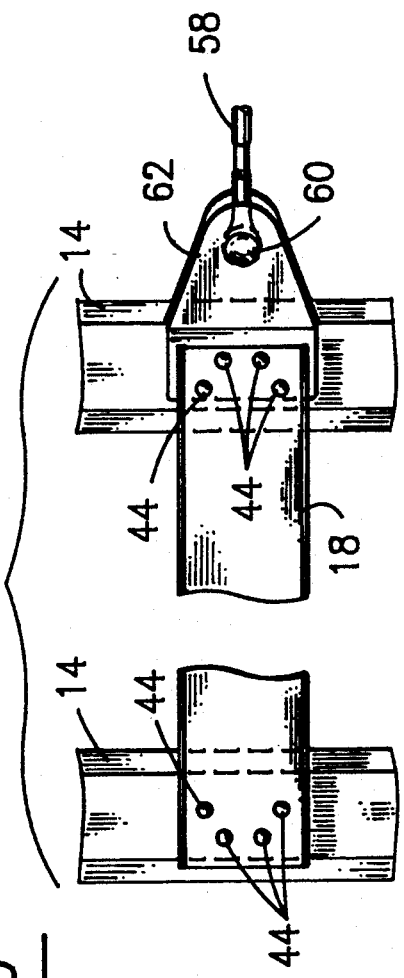
FIG. 10 is a top plan view of the attachment device of FIG. 1 along lines 10—10.
Figure 14:
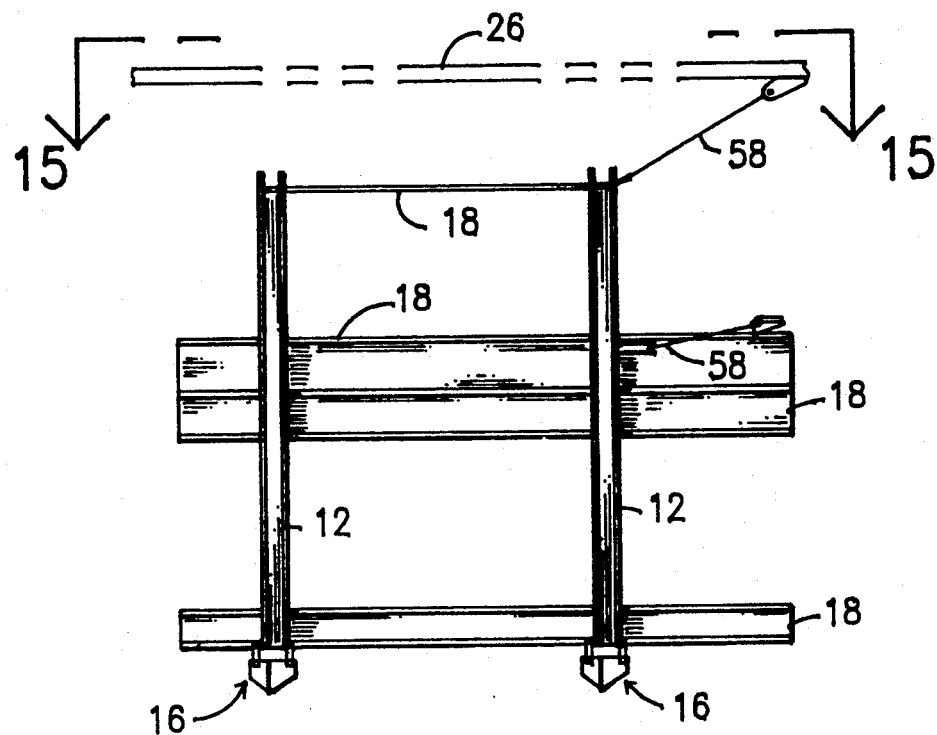
FIG. 14 is a side elevational view of the aircraft skeleton showing the intercostal members attached to the ribs along lines 14—14 of FIG. 15.
Figure 15:
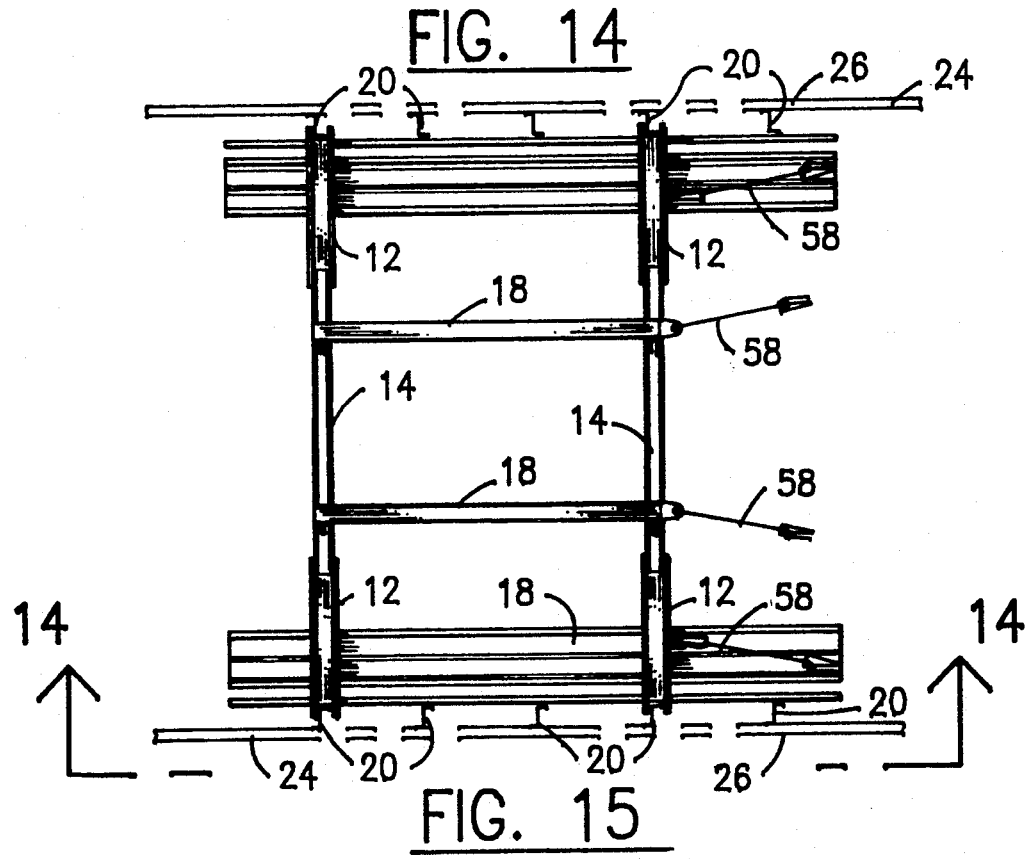
FIG. 15 is a top plan view of the aircraft skeleton showing the top connectors attached to ribs along lines 15—15 of FIG. 14.

A portion of the port side interior shell structure 10 is shown in FIG. 1. The shell structure has vertically arched U-shaped ribs 12 spaced apart in parallel alignment and attached at a top end with a connecting bracket 11 to an overhead lateral connector 14. A bottom portion of the arched rib member 12 is attached to a noise dampening member 16. As seen in FIGS. 8, 14 and 15 longitudinal intercostal members 18 are attached to all of the arched rib members 12. The rib members 12 enclose, but are spaced apart from, vertical frame members 20 of the aircraft. The intercostal members 18 enclose, but are spaced apart from, horizontal aircraft frame members 22.

The skin 26 of the aircraft is external to the frame member 20. An air space 24 is formed between the skin of the aircraft 26 and the skeleton 10. The air space 24 contains the hydraulic controls, the electrical controls and a portion of the air handling system of the aircraft. This equipment is not shown in the drawings.

Three panels 28, 30 and 32 respectively, are hinged from intercostal members 18 joining the ribs as shown in FIG. 8. Like panels are hinged on the starboard side of the aircraft. An overhead port panel 34 is hinged to the overhead connector 14. By dropping the panels, one can gain ready access to the controls and to the interior skin of the aircraft to check for corrosion or other damage. Additional panel enclosures 35, such as seen in FIGS. 1 and 8, can be suspended from the panels.

Each panel has a silicone rubber gasket 36 on its tip so that it can engage a corresponding silicone rubber gasket 36 on the next adjacent panel and thereby, ensure a tight noise free fit. In addition, the panels are all mounted on a bracket 38, attached at one end to the intercostal member 18 or overhead member 14, as the case may be, and at a second end to a panel bracket 40.

The panel pivots at point 42 between brackets 38 and 40.

As shown in FIG. 3, the bracket 38 is attached by rivets 44 to the overhead connector 14. The panel is held in position by a locking arm 46. Panel 28 would have to be opened in order to get access to the overhead panel locking arm 46 as seen in FIG. 2.

Figure 4:
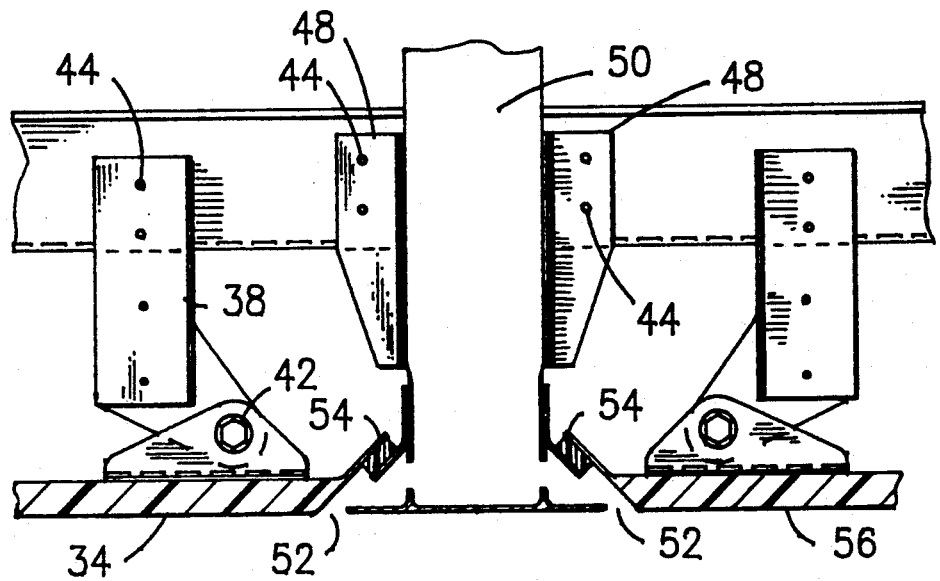
FIG. 4 is an enlarged view of the overhead lateral connector attached to an air plenum.
Figure 5:
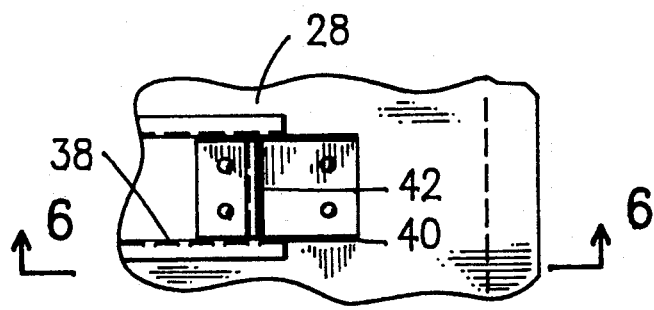
FIG. 5 is a top plan view of a hinge bracket along lines 5—5 of FIG. 2.
Figure 6:
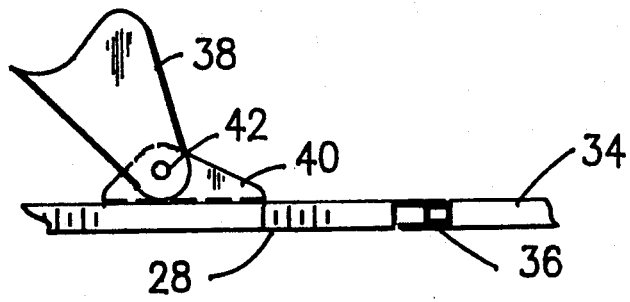
FIG. 6 is an elevational sectional view along line 6—6 of FIG. 5.

The overhead connector 14 is attached at one end by a flange 48 to the aircraft plenum 50 shown in FIGS. 3 and 4. Air flows out from the base of the panel 34 from the plenum 50 through air passages 52. A gasket 54 between the panel 34 end and the plenum 50 prevents noise between the individual components.

Figure 7:
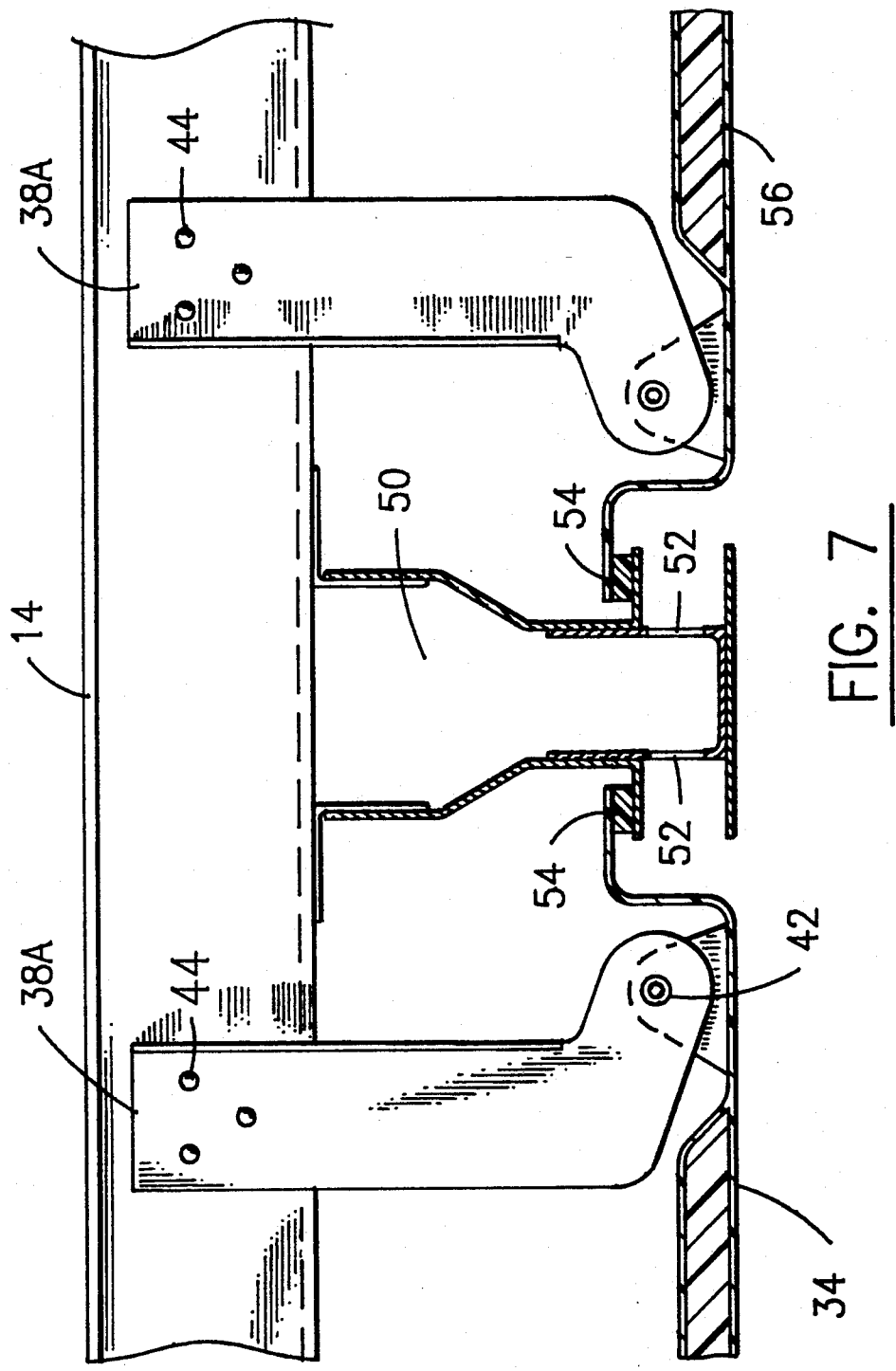
FIG. 7 is a elevational view of an overhead lateral connector attached in an alternate way to a plenum and supporting ceiling panels.

FIG. 7 shows another embodiment of a bracket 38A attached to the overhead connector 14 and hinged at pivot point 42 to allow a downward movement of the ceiling panel 34. The difference is in the structure of hinge bracket 38A. Panel 56 on the starboard side of the aircraft is shown in FIG. 7.

The interior skeletal structure 10 is held in place by several cable attachment devices 58 shown in FIGS. 8, 9, 10, 14 and 15 wherein a first end 60 of the cable attachment device 58 is attached to a bracket 62 on the intercostal member 18. A second end 64 is attached to a bracket 66 attached to a frame member 22 of the aircraft. The cable attachment device 58 is adjustable to position the interior skeleton within the aircraft without touching the aircraft frame members.

Figure 13:
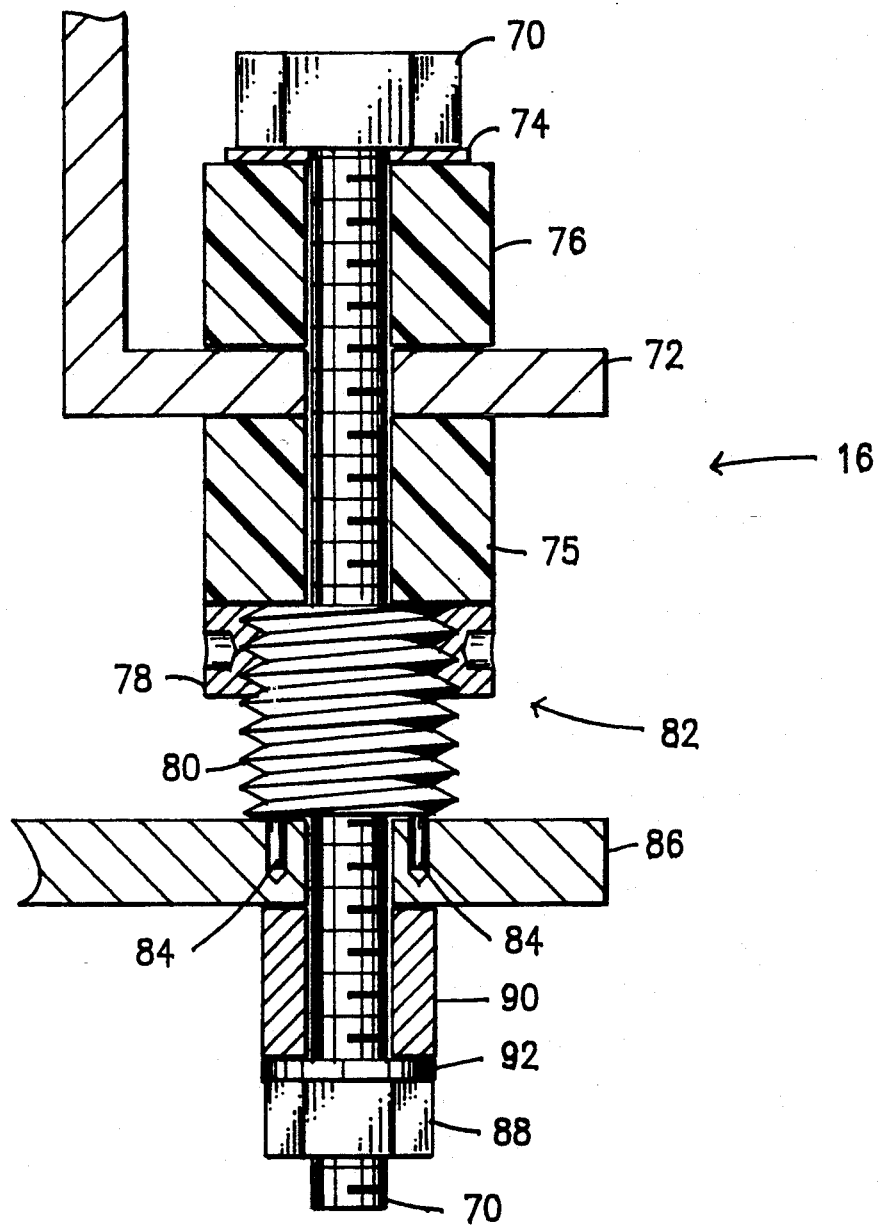
FIG. 13 is a sectional elevational view of the dampening device in FIG. 12.

A key feature of the invention is the attachment of the bottom end of each rib 12 to the dampening device 16 as shown in FIGS. 11, 12 and 13. The dampening device 16 ensures that the skeletal structure 10 does not touch the frame of the aircraft and therefore, does not vibrate or cause interior noise based on the vibration of the aircraft frame.

The dampening device 16 is bolted by bolt 70 at one end to a flange 72 attached to a rib member 12. A DELRIN ® washer 74 separates the head of the bolt 70 from a silicone spacer 75 abutting the flange 72. Another silicone spacer 76 is located below the flange 72 and is attached to a cylindrical tube 78 having interior threads which are engaged to the exterior threads 80 of a second cylindrical bolt member 82. The second cylindrical bolt member 82 is attached through pins 84 to a flange 86 on the frame structure 20 of the aircraft. Flange 86 attaches to mounting bracket 87 and flange 89 attaches the bracket to the side of frame member 20 by rivets 44. The nut 88 at the end of the bolt 70 adheres the bolt to the bottom of the flange 86. Another spacer 90 made out of metal and a washer 92 separates the nut 88 from the bottom of the aircraft flange 86.

The vertical arched ribs 12 can be made of molded carbon fiber as can the horizontal intercostal members 18 joining the ribs 12. Both the ribs 12 and the intercostal members 18 are U-shaped in form so that they can fit around frame members on the aircraft. However, the ribs 12 and horizontal intercostal members 18 do not directly touch the frame of the aircraft so that the interior of the aircraft can be completely isolated from the aircraft frame itself. The distance between ribs on the aircraft depends on the type of aircraft involved and will usually conform to the frame members of the aircraft itself.

The panels are usually made of a honeycomb material in accordance with standard aircraft practice.

The interior structure of this invention not only provides an acoustical barrier and easy access to the vital aircraft operating components but is also a fire and smoke barrier to prevent such smoke and flame from reaching the interior of the aircraft during an accident. Although only the port side of the aircraft frame is shown in FIG. 1, an identical configuration is set forth on the starboard side of the aircraft so that a total of three side panels and one ceiling panel are provided for each side of the aircraft.

Having thus described the invention, what is claimed and desired to be secured by Letters Patent is:

1. An aircraft interior shell spaced apart from the aircraft fuselage comprising:
   (a) multiple parallel U-shaped upright arched rib members spaced apart from corresponding fuselage upright frame members on a port and starboard side of the aircraft,
   (b) an overhead connecting member attached to a top portion of each opposing port and starboard rib member,
   (c) a noise dampening member joining a bottom portion of each rib member to a fuselage frame member,
   (d) multiple parallel longitudinal intercostal members joining adjacent port rib members,
   (e) multiple parallel longitudinal intercostal members joining adjacent starboard rib members,
   (h) interior panels hinged from the intercostal members and overhead connecting members to form the interior portion of the aircraft and
   (g) means to support the interior shell from movement within the fuselage.

2. The aircraft interior shell according to claim 1 wherein the U-shaped portion of the arched rib member encloses a corresponding fuselage upright frame member and the longitudinal intercostal members are attached to the rib members distal from the fuselage upright frame member.

3. The aircraft interior shell according to claim 2 wherein the interior panels are hinged at a first end to a bracket attached to the intercostal member and at a second end to a quick release pin attached to a bracket engaged to the intercostal member.

4. The aircraft interior shell according to claim 1 wherein each interior panel at an end distal from the hinge is engaged with an adjacent panel.

5. The aircraft interior shell according to claim 4 wherein each adjacent panel engaged to another panel has a gasket separating opposed surfaces on each panel.

6. The aircraft interior shell according to claim 1 wherein the noise dampening member is a pair of opposed adjustable bolts, a first bolt having interior threads and a second bolt having exterior threads engageable to the first bolt, the first bolt bolted to a flange attached to the rib member and the second bolt bolted to a flange attached to an aircraft frame member.

7. The aircraft interior shell according to claim 6 wherein each bolt is spaced from a flange by a silicone spacer.

8. The aircraft interior shell according to claim 1 wherein the means to support the interior shell are brackets attached to an aircraft frame member joined by a cable to a corresponding bracket attached to a longitudinal intercostal member, the cable forming an acute angle with the frame member and intercostal member.

* * * * *